INVENTOR
R. N. WATTS
BY Lucian C. Canepa
ATTORNEY

FIG. 2

| 10-DIGIT INPUTS TO COMBINATORIAL CCT. 350 | CORRESPONDING ACTIVATED OUTPUT LEAD OF CCT. 350 |
|---|---|
| 1 0 0 0 0 1 1 0 0 1 | 301 |
| 1 0 0 0 1 0 1 0 1 1 | 302 |
| 1 0 0 1 0 0 1 1 1 1 | 303 |
| 1 0 1 0 0 0 0 1 1 1 | 304 |
| 1 1 0 0 0 1 0 1 1 1 | 305 |
| 0 0 0 0 1 1 0 1 1 1 | 306 |
| 0 0 0 1 1 0 1 1 1 0 | 307 |
| 0 0 1 1 0 1 1 1 0 0 | 308 |
| 0 1 1 0 1 1 1 0 0 0 | 309 |
| 1 1 0 1 1 1 0 0 0 0 | 310 |
| 0 0 1 1 1 1 1 0 0 1 | 311 |
| 0 1 1 1 1 1 0 0 1 0 | 312 |
| 1 1 1 1 1 0 0 1 0 0 | 313 |
| 0 1 1 1 0 1 0 0 0 1 | 314 |
| 1 1 1 0 1 0 0 0 1 0 | 315 |
| 0 1 0 1 0 1 1 1 0 1 | 316 |
| 1 0 1 0 1 1 1 0 1 0 | 317 |
| 1 1 0 1 1 0 1 1 0 1 | 318 |
| 0 0 1 1 0 0 0 0 1 1 | 319 |
| 0 1 1 0 0 0 0 1 1 0 | 320 |
| 1 1 0 0 0 0 1 1 0 0 | 321 |

April 8, 1969 R. N. WATTS 3,437,995

ERROR CONTROL DECODING SYSTEM

Filed March 15, 1965 Sheet 3 of 3

| SHIFT NO. | CONTENTS OF SYNDROME GENERATOR |
|---|---|
| 1 | 1 0 0 0 0 0 0 0 0 0 |
| 2 | 0 1 0 0 0 0 0 0 0 0 |
| 3 | 0 0 1 0 0 0 0 0 0 0 |
| 4 | 0 0 0 1 0 0 0 0 0 0 |
| 5 | 0 0 0 0 1 0 0 0 0 0 |
| 6 | 0 0 0 0 0 1 0 0 0 0 |
| 7 | 0 0 0 0 0 0 1 0 0 0 |
| 8 | 0 0 0 0 0 0 0 1 0 0 |
| 9 | 0 0 0 0 0 0 0 0 1 0 |
| 10 | 0 0 0 0 0 0 0 0 0 1 |
| 11 | 1 1 0 0 0 0 1 1 0 0 |
| 12 | 0 1 1 0 0 0 0 1 1 0 |
| 13 | 0 0 1 1 0 0 0 0 1 1 |
| 14 | 1 1 0 1 1 0 1 1 0 1 |
| 15 | 1 0 1 0 1 1 1 0 1 0 |
| 16 | 0 1 0 1 0 1 1 1 0 1 |
| 17 | 1 1 1 0 1 0 0 0 1 0 |
| 18 | 0 1 1 1 0 1 0 0 0 1 |
| 19 | 1 1 1 1 1 0 0 1 0 0 |
| 20 | 0 1 1 1 1 1 0 0 1 0 |
| 21 | 0 0 1 1 1 1 1 0 0 1 |
| 22 | 1 1 0 1 1 1 0 0 0 0 |
| 23 | 0 1 1 0 1 1 1 0 0 0 |
| 24 | 0 0 1 1 0 1 1 1 0 0 |
| 25 | 0 0 0 1 1 0 1 1 1 0 |
| 26 | 0 0 0 0 1 1 0 1 1 1 |
| 27 | 1 1 0 0 0 1 0 1 1 1 |
| 28 | 1 0 1 0 0 0 0 1 1 1 |
| 29 | 1 0 0 1 0 0 1 1 1 1 |
| 30 | 1 0 0 0 1 0 1 0 1 1 |
| 31 | 1 0 0 0 0 1 1 0 0 1 |

United States Patent Office 3,437,995

Patented Apr. 8, 1969

3,437,995

ERROR CONTROL DECODING SYSTEM

Robert N. Watts, Westfield, N.J., assignor to Bell Telephone Laboratories, Incorporated, New York, N.Y., a corporation of New York Filed Mar. 15, 1965, Ser. No. 439,649
Int. Cl. G08b 29/00; G08c 25/00
U.S. Cl. 340—146.1 10 Claims

ABSTRACT OF THE DISCLOSURE

A decoder for automatically detecting and correcting certain types of erroneously-received digital data sequences that have been encoded in accordance with a cyclic or pseudo-cyclic code includes a combinatorial circuit having the same number of output leads as there are information digits in each encoded sequence. This circuit functions in combination with a single syndrome shift register unit and a counter to identify the error syndrome patterns that correspond to all the single- and double-error occurrences that include at least one information digit. In the course of this identification process the combinatorial circuit provides a unique signal on that one of its output leads which corresponds to the digit position of a single erroneous information signal. If two information signals are in error, the identification is accomplished by the energization of a single one of the output leads and by the registration contained in the associated counter.

Figure 1:
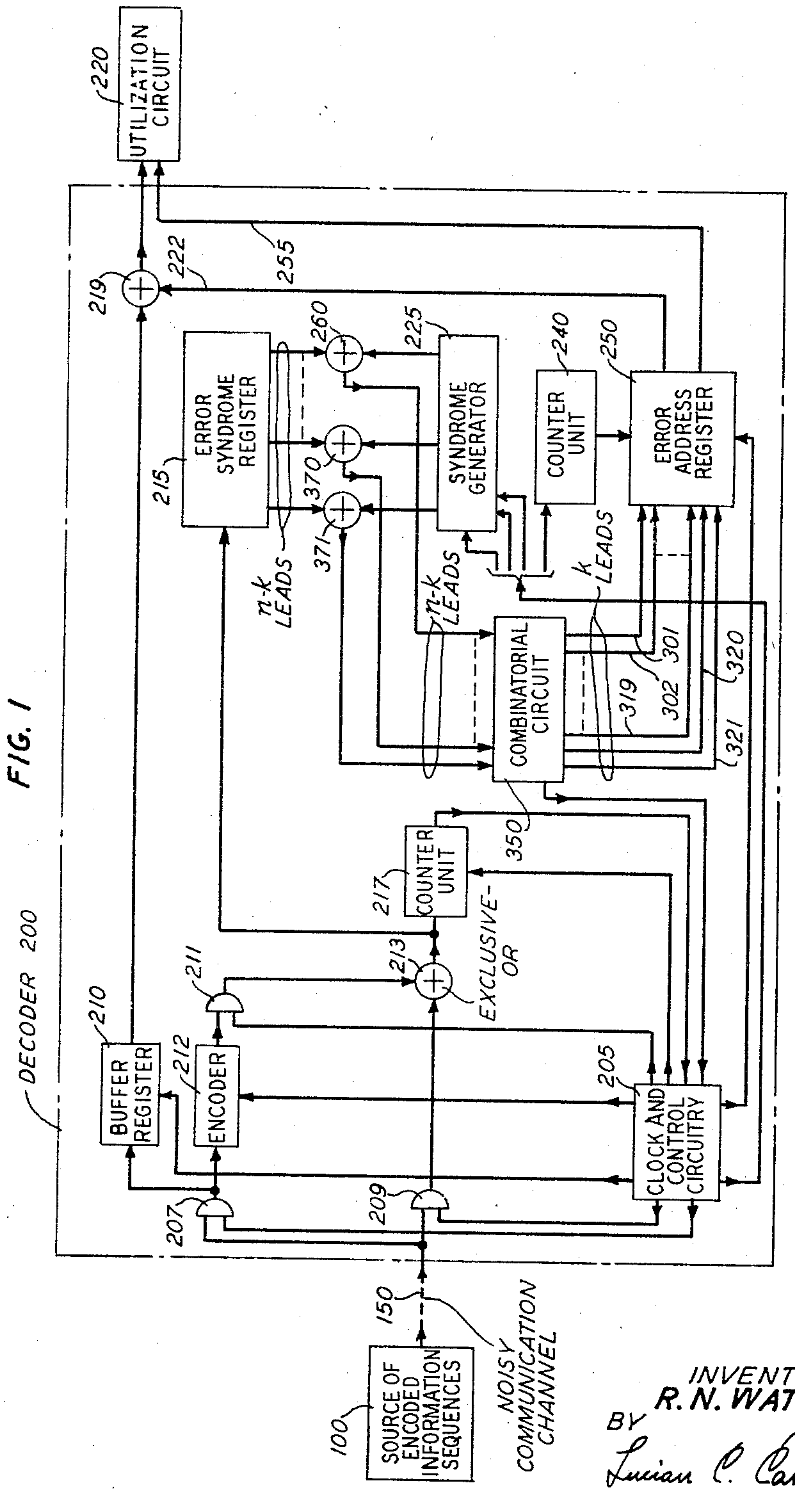

This invention relates to digital information-processing systems and more particularly to the automatic correction and/or detection of errors in such systems.

The problem of correctly transmitting digital signals along a noisy channel is a significant one whose solution has been actively sought. Some illustrative situations in which this problem arises are: when telephone lines subject to error impulses are being used to transmit data in digital form; when an imperfect medium such as magnetic tape or a photographic emulsion is used to store digital data; or when operations on digital signals are being carried out by means of circuits constructed of devices such as relays, diodes or transistors which have a probability of error.

By using techniques of redundancy it is possible to encode binary information signals to be transmitted in such a way that a decoder is able to extract the original information content therefrom with a high degree of reliability despite the fact that the information signals may have been mutilated to some limited extent during transmission. For more extensive types of mutilation the decoder may not be capable of automatically correcting the information portion of the received signals. However, in cases of more extensive mutilation the decoder may at least be able to detect that the information portion of the received signals is in error. In turn, information signals detected to be in error may be suitably tagged or designated as being erroneous before being delivered to an associated utilization circuit. Also, circuitry may be provided which responds to the detection of erroneous information signals to signal the transmitting equipment of the system to retransmit the erroneously-received and uncorrected sequence.

An object of the present invention is the improvement of digital information-processing systems.

More specifically, an object of this invention is a digital information-processing system having error-correcting and detecting capabilities.

Another object of the present invention is an error control system whose over-all organization is characterized by simplicity of design.

These and other objects of the present invention are realized in a specific illustrative embodiment thereof which comprises a novel decoder to which encoded information sequences of a cyclic or pseudo-cyclic code are applied via a noisy or error-prone communication channel. The information sequences are encoded to contain sufficient redundancy to permit them to be slightly mutilated during their propagation along the noisy channel and still be correctly interpreted by the decoder.

Each encoded information sequence received by an illustrative decoder made in accordance with the principles of the present invention includes $n$ digits, the first $k$ of which are information digits and the remainder of which are check digits. The check digits are derived from the information digits in accordance with a predetermined parity relationship which makes it possible for the decoder to automatically correct all those single- and double-error patterns that include at least one erroneous information digit. For other error patterns the decoder may be able to detect the occurrence thereof.

Briefly, an illustrative decoder embodying the principles of this invention includes circuitry responsive to the information digit portion of a received redundant sequence for recalculating a set of check digits in accordance with exactly the same parity relationships by which encoding circuitry at the transmitting terminal had generated the $n-k$ check digits of a transmitted sequence. The check digits recalculated in the decoder are then compared with the check digits included in the received sequence. The module 2 sum of these two sets of check digits is an $n-k$ digit error syndrome word which is stored in an error syndrome register. If the number of "1's" in this word is 2 or less, the received information digits are thereby indicated to be correct and are therefore delivered to an associated utilization circuit without further processing. If the number of "1's" in the noted word is greater than 2, an attempt is made by the decoder to locate the error or errors in the information digit portion of the received sequence.

The attempt by the decoder to locate errors in a received redundant sequence involves, initially, the application of the error syndrome word to a combinatorial circuit having $k$ output leads. These leads correspond respectively to the $k$ information digits of the received sequence. If the error syndrome word representative of a single error (an erroneous information digit) is applied to the combinatorial circuit, the circuit provides a unique signal on that one of its output leads which corresponds to the digit position of the erroneous information signal. If such an output occurs, the search for errors ends and one particular information digit is positively identified as being in error. Correction of the received sequence is carried out simply by inverting the single erroneous information digit. If the combinatorial circuit does not provide a unique output signal in response to the application thereto of the error syndrome word, the second phase of the decoding operation is initiated. This phase involves a search for all those double-error patterns which include at least one erroneous information signal. The search is carried out by adding (modulo 2) the error syndrome word to successive binary patterns generated by a syndrome shift register unit. In turn, these successive sums are applied to the combinatorial circuit. If the combinatorial circuit responds thereto by providing a unique output signal, the occurrence of a double-error pattern is indicated and, in addition, the position of an erroneous information digit of that pattern is thereby specified. Furthermore, a counter, which registers the number of shift signals that had to be applied to the shift register unit to achieve the unique signal output from the combinatorial circuit, indicates by its count whether the other error of the detected pattern is in the check or information digit portion of the received sequence. Moreover, if the other error is in the information portion of the sequence, the digit position of the other erroneous information signal is represented by the registration of the counter. As before, correction is carried out by respectively inverting the erroneous information digit or digits.

If no output occurs from the combinatorial circuit during the complete shifting cycle of operation of the syndrome unit, the decoder provides a signal indicative of the detection of an uncorrected error pattern.

It is a feature of the present invention that an error control decoder include a combinatorial circuit and a single syndrome shift register unit which in combination identify the error syndrome patterns that correspond to all the single- and double-error occurrences that include at least one information digit.

It is a further feature of this invention that the combinatorial circuit include $k$ output leads each of which corresponds to a different information digit position of a received redundant sequence.

It is a still further feature of the invention that the decoder include circuitry for successively adding (modulo 2) sequentially-generated outputs of the shift register unit to an error syndrome pattern and for applying the successive sums to the combinatorial circuit.

Figures 3A, 3B:
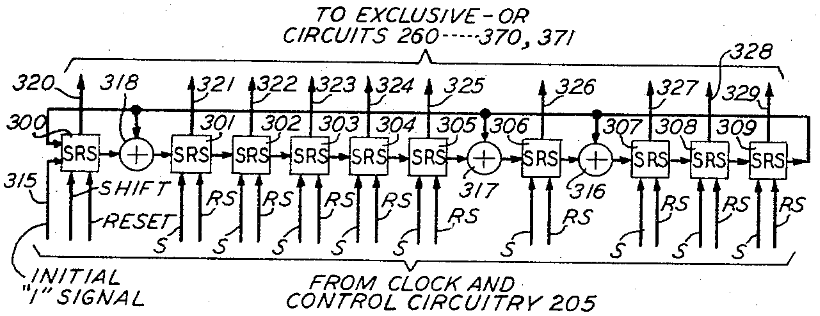

A complete understanding of the present invention and of the above and other objects, features and advantages thereof may be gained from a consideration of the following detailed description of a specific illustrative embodiment thereof presented hereinbelow in connection with the accompanying drawing, in which:

FIG. 1 depicts an information-processing system which includes a specific illustrative decoder made in accordance with the principles of the present invention;

FIG. 2 lists a particular set of $k$ $n-k$ digit input binary representations and designates the corresponding output leads of a combinatorial circuit 350 that are respectively activated thereby;

FIG. 3A shows the configuration of a syndrome generator 225 included in the novel decoder of FIG. 1; and FIG. 3B lists the binary representations generated by the unit 225 in response to successive shift signals applied thereto.

The system shown in FIG. 1 includes a source 100 for supplying successive encoded information sequences each of which is a member of a cyclic or pseudo-cyclic code. Each of the sequences supplied by the source 100 includes $n$ digits the first $k$ of which are check digits that are formed with respect to the information digits in accordance with a predetermined parity relationship. Codes of this general type are well-known in the art, being described, for example, in "Error-Correcting Codes" by W. W. Peterson, The M.I.T. Press and John Wiley and Sons, 1961.

If the minimum distance between any two sequences of such a code is $2e+1$, where $e$ is any positive integer, the code is sufficiently redundant that it is possible to correct all occurrences of $\leq e$ errors in an $n$-digit sequence thereof. However, in accordance with the principles of the present invention, the full error-correcting capabilities of such a code are not taken advantage of by the novel decoder shown in FIG. 1. Instead, the decoder is arranged to correct only those single- and double-error occurrences which include at least one erroneous information digit. By limiting the error-correcting capabilities in this way it has been found that the decoding function can be performed in an efficient manner by equipment that is relatively simple. For many information-processing applications of practical importance this limited error-correction capability is adequate to significantly improve the over-all reliability of the system.

The source 100 is assumed to be capable of generating $2^k$ different $k$-digit information binary sequences. Herein, for illustrative purposes, $k$ will be assumed to be 21. Hence, the source 100 will be considered to be capable of generating $2^{21}$ or approximately 2,000,000 different 21-digit information sequences. As noted above, each of these information sequences is then encoded in accordance with known principles in such a manner that $n-k$ check digits are appended thereto. Herein $n-k$ will be assumed to be 10. Thus, each illustrative $n$-digit sequence will include a total of 31 digits.

Sequences supplied by the source 100 of FIG. 1 are coupled via a noisy or error-prone communication channel 150 to a specific illustrative decoder 200 which is constructed in accordance with the principles of the present invention. It is to be understood that the channel 150 may be of a type that interconnects remotely-spaced encoding and decoding units, such as in a long distance communication system. On the other hand, the channel 150 may equally well be considered to be of the type which interconnects encoding and decoding units associated with information-processing equipment positioned at a single location. In either case, the decoder is capable of abstracting the original $k$-digit information content from the transmitted redundant sequence even if the sequence is mutilated to a limited extent during propagation along the channel. Specifically, the decoder 200 is capable of processing a received sequence to correct all those single- and double-error occurrences therein which include at least one erroneous information digit.

Before proceeding to a detailed description of the decoder 200 shown in FIG. 1, it will be helpful to a better understanding thereof to briefly discuss the nature of the decoding process. Additionally, in view of the fact that certain portions of the decoder are similar in construction and operation to be the encoding equipment included in the source 100, reference to the encoding process is also considered to be relevant.

The encoding equipment in the source 100 includes a feedback shift register of the general type shown in the aforecited Peterson text. Basically, the action of such an encoder corresponds to dividing a polynomial representative of an information sequence by a polynomial P(X) whose coefficients are determined by the feedback connections of the encoding shift register. In general, a $k$-digit information sequence is represented by the polynomial $$D(X)=d_0+d_1X+\ .\ .\ .\ +d_{k-1}X^{k-1} \qquad (1)$$

In this representation the information digits corresponding to the high order coefficients are delivered first to the channel 150. Each of the coefficients $d_0, d_1 \ldots d_{k-1}$ in representation (1) is a "0" or a "1," depending respectively on the binary value of the correspondingly-positioned information digit. After $k$ information digits have been shifted into such an encoder and simultaneously shifted to the channel, the feedback connection of the encoder is disabled and the contents of the shift register are delivered to the channel. The contents thereof comprise the remainder R(X) of $$X^{n-k}D(X)/P(X)\,[\text{i.e., } X^{n-k}D(X)\ \text{MOD}\ P(X)] \qquad (2)$$

Thus the redundant sequence $V_T(X)$ delivered to the channel 150 is represented by $$V_T(X)=X^{n-k}D(X)+R(X) \qquad (3)$$

The sequence $V_R(X)$ actually received by the decoder 200 of FIG. 1 is $$V_R(X)=V(X)\oplus N(X)=X^{n-k}D_R(X)+R_R(X) \quad (4)$$

where N(X) is the error sequence caused by noise on the channel 150 and the symbol $\oplus$ indicates modulo 2 addition of the transmitted and error sequences on a bit-by-bit basis (e.g., $1101\oplus1010=0111$). Separating N(X) into two parts, $D_N(X)$ and $R_N(X)$ corresponding to errors in the information and check portions of $V_T(X)$, respectively, $V_R(X)$ may then be represented as follows:

$$V_R(X)=X^{n-k}[D(X)\oplus D_N(X)]+R(X)\oplus R_N(X) \quad (5)$$

The first $k$ digits of $V_R(X)$ are re-encoded in the decoder 200 to obtain a recalculated set $R_L(X)$ comprising $n-k$ check digits. These recalculated check digits are then added modulo 2 to the received set of check digits to provide an error syndrome S(X) which is representative of the error status of the received redundant sequence. In other terms, $$S(X)=R_R(X)\oplus R_L(X) \quad (6)$$

which may be expressed as $$S(X)=X^{n-k}[D(X)\oplus D_N(X)] \text{ MOD } P(X)\oplus R(X)\oplus R_N(X) \quad (7)$$

And since $$X^{n-k}D(X) \text{ MOD } P(X)=R(X),$$
$$S(X)=X^{n-k}D_N(X) \text{ MOD } P(X)+R_N(X) \quad (8)$$

The number of "1" signals in the $n-k$ digit error syndrome word is then determined. If this number or "weight" is 2 or less, the received information digits are accepted as correct. This is so because the only $r$ error patterns (where $r$ equals 1 or 2) which produce an error syndrome of weight $r$, consist of $r$ errors in the check digit portion of the received sequence. However, if the weight of the error syndrome is greater than 2, an attempt is made to locate the error or errors in the information portion of the sequence. This attempt involves determining in a systematic manner whether or not the error syndrome word is identical to one of the error location patterns corresponding to all those single- and double-error occurrences which include at least one erroneous information digit. The specific manner in which this is done will be illustrated in detail hereinbelow in connection with a particular decoding example.

However, first let us consider the components included in the illustrative decoder shown in FIG. 1. Clock and control circuitry 205 is provided therein for performing conventional timing, enabling, resetting, counting, shifting and control functions. To initiate a decoding cycle of operation the circuitry 205 controls gate units 207, 209 and 211 in the following manner: first, the gate units 209 and 211 are disabled and the gate unit 207 is enabled. As a result, the first $k$ digits (the information portion) of a received sequence are applied to a buffer register 210 and to an encoder 212 whose arrangement and operation are identical to that of the encoding equipment included in the source 100. Subsequent to the receipt of the information digits by the encoder 212, the encoder contains therein a recalculated $n-k$ digit check sequence. If no errors occurred during transmission, this recalculated check sequence should be identical to the check portion of the received sequence.

The actual comparison between the two check sequences is carried out under control of the circuitry 205. Specifically, after receipt by the decoder 200 of the $k$ information digits of a received sequence, the gate unit 207 is disabled and the units 209 and 211 are enabled. The recalculated check digits are then applied in sequence via the unit 211 to an EXCLUSIVE-OR circuit 213. In synchronism therewith the $n-k$ check digits of the received redundant word are sequentially applied via the enabled unit 209 to the EXCLUSIVE-OR circuit 213. The circuit 213 compares the binary representations in corresponding digit positions of the two noted check sequences and provides a "1" output signal each time that corresponding digits differ in value.

The output of the EXCLUSIVE-OR circuit 213 is the error syndrome word or pattern referred to above. This $n-k$ digit binary pattern is applied to an error syndrome register 215 wherein it is stored for subsequent comparison operations. Additionally, the output of the circuit 213 is applied to a unit 217 which counts the number of "1" signals therein. In turn, the unit 217 supplies signals indicative of this count to the circuitry 205. At this time the encoder 212, the EXCLUSIVE-OR circuit 213 and the counter unit 217 are no longer needed for the processing of the received sequence whose error syndrome word has just been determined. Accordingly, these units may at this point in the decoding operation be controlled by the circuitry 205 to commence the generation and weighing of the error syndrome word of the next received sequence.

If the count indicated by the unit 217 is 2 or less (indicative of the information digits being error-free) the circuitry 205 responds thereto by initiating a readout from the buffer register 210 to a utilization circuit 220 via an output EXCLUSIVE-OR circuit 219. During this readout operation no correction signals are applied to the circuit 219 by way of lead 222, whereby the received information sequence is delivered to the utilization circuit 220 in unmodified form.

If the count indicated by the unit 217 is greater than 2, an attempt is made by the decoder 200 to locate and correct the erroneous portion of the received sequence. This attempt involves three main steps. The first step comprises the application of the error syndrome word stored in the register 215 to a combinatorial circuit 350. This word is applied to the circuit 350 via $n-k$ EXCLUSIVE-OR circuits 260 . . . 370, 371. During this first step a syndrome generator 225 has registered therein an all-zero binary representation. Therefore, the error syndrome word passes in unmodified form through the noted EXCLUSIVE-OR units to the circuit 350.

The combinatorial circuit 350 includes $n-k$ input leads and $k$ output leads 301, 302 . . . 319, 320, 321. For the particular illustrative case considered herein, the circuit 350 includes 10 input leads and 21 output leads designated 301 through 321. The configuration of the circuit 350 is such that it responds to each of a set of 21 10-digit binary words by activating a different one of its output leads. In particular, the circuit 350 responds to the 10-digit representations listed in FIG. 2 by respectively activating the output leads specified in corresponding rows. Thus, for example, if the 10-digit word 1000011001 appearing in the first row of FIG. 2 is applied to the input leads of the circuit 350, only the output lead 301 thereof is activated. In a similar manner each of the other output leads of the circuit 350 is associated with a unique 10-digit input word. No more than one output lead of the circuit 350 is ever activated at any one time.

The particular $n-k$ digit words listed in FIG. 2 comprise all those $n-k$ digit sequences which would appear at the output of the EXCLUSIVE-OR circuit 213 in response to only one received digit (an information digit) being in error. More specifically, each of the $k$ words in FIG. 2 is uniquely representative of an error occurrence in a different digit position of the $k$-digit information portion of a received sequence. In fact, the words listed in FIG. 2 correspond respectively to a single-error occurrence in the first through $k$th information digits received by the decoder 200. Thus, for example, if the error syndrome word applied to the combinatorial circuit 350 results in the activation of the output lead 319, the 19th received information digit is thereby indicated to be in error.

An error address register 250 responds to the simultaneous application thereto of a control signal from the circuitry 205 and a signal from an activated output lead of the circuit 350 to provide a "1" correction signal. This signal is supplied to the lead 222 in synchronism with the application to the circuit 219 from the buffer register 210 of the particular information digit determined to be in error. In the example above, a "1" correction signal would be applied to the circuit 219 at the time that the 19th information digit is also applied thereto. An erroneous "0" information signal is thereby converted to a "1" signal and, conversely, an erroneous "1" information signal is in that manner changed to a "0" representation.

The combinatorial circuit 350 shown in FIG. 1 may include relays, or a diode matrix array, or any other appropriate switching devices. The manner in which to arrange such devices to satisfy the relationships listed in FIG. 2 is well known to those in the switching art. For example, chapter 6 of "Switching Circuits and Logical Design," by S. H. Caldwell, John Wiley, 1958 (see in particular, FIG. 6–1) describes the arrangement and design of a combinatorial circuit which is suitable for inclusion in the decoder of FIG. 1.

The decoding step specified above comprises the search for a single error in the received information sequence. If during this search the combinatorial circuit 350 provides an output signal, the occurrence and location of a single error are thereby indicated. If during this search no output signal is supplied by the circuit 350, the step described below and designated No. 2 is carired out.

Before describing step No. 2, however, let us consider the arrangement of the syndrome generator 225 which is shown in detail in FIG. 3A. The generator 225 includes $k$ conventional shift register stages. Herein $k$ is assumed for illustrative purposes to equal 10. Therefore, the generator 225 includes 10 stages 300 through 309, each of which is designated SRS. The output of each shift register stage is applied to its adjacent stage either directly or, in the case of the stages 300, 305 and 306, is applied thereto via an associated EXCLUSIVE-OR circuit. Also applied to each stage are SHIFT and RESET signals obtained from the clock and control circuitry 205. In addition, the left-most stage 300 of the register has another input lead 315 extending thereto. As described below, an initial "1" signal is applied to this lead 315 from the circuitry 205.

Furthermore, the output of the shift register stage 309 shown in FIG. 2A is not only applied directly to one input of the left-most stage 300, but is also applied to the EXCLUSIVE-OR circuits 316, 317 and 318. In addition, the leads 320 through 329 connected to the stages 300 through 309 convey signals representative of the respective contents thereof to the EXCLUSIVE-OR circuits 260 . . . 370, 371 shown in FIG. 1.

As noted above, the aforedescribed first decoding step involves the application of the error syndrome word stored in the register 215 to the combinatorial circuit 350. It is emphasized that during this step the syndrome generator 225 is in its reset or all-zero condition, so that the error syndrome word is applied from the register 215 to the combinatorial circuit 350 in unmodified form.

The failure of the circuit 350 to activate one of its output leads 301, 302 . . . 319, 320, 321 during the first decoding step initiates in the decoder 200 the commencement of the second aforementioned main decoding step. In preparation for this second step an initial "1" signal is applied to the shift register stage 300 of FIG. 3A, and an associated counter unit 240 is set to a count of one. The resulting 10-digit binary representation stored in the stages 300 through 309 of the syndrome generator 225 after the application thereto of this initial "1" signal is indicated in the first row of FIG. 3B.

The second decoding step is a search for those double-error patterns which correspond to one information digit and one check digit being in error. This step involves adding (modulo 2) in the EXCLUSIVE-OR circuits 260 . . . 370, 371 the respective $n-k$ digit indications stored in the register 215 and the generator 225. This modulo 2 sum of the stored error syndrome word and the first word listed in FIG. 3B is applied to the combinatorial circuit 350. If this sum does not cause the circuit 350 to activate one of its output leads, the generator 225 is shifted once more—to form therein the representation listed in the second row of FIG. 3B—and the counter unit 240 is incremented by one. Again, a modulo 2 sum of the contents of the register 215 and the generator 225 is found and applied to the circuit 350.

Successive shifts of the syndrome generator 225 result in a sequence of 10-digit sums being applied to the combinatorial circuit 350. This operation continues until the generator 225 has been shifted $n-k$ times or until the circuit 350 provides an output signal, whichever occurs first. If at any time during this operation the circuit 350 provides an output signal, the cycling of the generator 225 stops and the position of the erroneous information digit to be corrected is indicated by which one of the output leads of the circuit 350 is activated. A total count of $n-k$ or less by the unit 240 is disregarded because we are not concerned herein with the correction of errors in the check digit portion of a received sequence.

The third main step characteristic of the decoder 200 shown in FIG. 1 comprises a search for double errors in the information digit portion of a received sequence. This last step is initiated if neither one of the previously-described first and second steps has succeeded in locating the erroneous portion of the sequence. The third step is a continuation of the second one and involves shifting the syndrome generator 225 one additional time (the $n-k+1$st time). The contents of the generator 225, namely, the binary word 1100001100 listed in the 11th row of FIG. 3B, is then added modulo 2 to the error syndrome word stored in the register 215. In turn, the sum thereof is applied to the combinatorial circuit 350. Subsequent successive shifts of the generator 225 produce in order the other patterns listed in FIG. 3B. This mode of operation is repeated in sequence until the generator 225 has been shifted $n-1$ times or until the circuit 350 produces an output signal, whichever occurs first.

If an output lead of the combinatorial circuit 350 is activated during the third decoding step described above, the actual locations of the two erroneous information digits are respectively designated by the noted output lead and by the count registered in the counter unit 240. In particular, if the $j$th output lead of the circuit 350 is activated and if the unit 240 indicates a count of $a$, the two erroneous information digits are specified to be in digit positions $j$ and $n+1-a$.

The outputs of the combinatorial circuit 350 and the counter unit 240 are applied to the error address register 250 which, under the control of signals from the circuitry 205, supplies two "1" correction signals to the EXCLUSIVE-OR circuit 219. These correction signals are supplied to the circuit 219 in synchronism with the application thereto from the buffer register 210 of the information digits in digit positions $j$ and $n+1-a$. In this way the two erroneous information digits are inverted and thereby corrected before being delivered to the utilization circuit 220.

If no output signal is generated by the combinatorial circuit 350 during the third decoding step, an error pattern exists in the received sequence but the pattern is uncorrectable by the decoder 200 of FIG. 1. In this eventuality the contents of the buffer register 210 may be delivered to the utilization circuit 220 in unmodified form accompanied by an error signal from the error address register 250. This error signal, which is applied to the circuit 220 via a lead 255 emanating from the register 250, indicates to the circuit 220 the presence of a detected but uncorrected error occurrence in the received sequence.

In addition to tagging uncorrectable information sequences delivered to the utilization circuit 220, the decoder 200 may, if desired, be adapted to respond to an error signal on the lead 255 to trigger a request to the source 100 for a retransmission of the erroneous and uncorrected information. The arrangement of a typical such retransmission system is described in a copending application of L. P. McRae, R. N. Watts and W. J. Wolf, Jr., Ser. No. 356,528, filed Apr. 1, 1964.

A specific example will serve to illustrate the particular manner in which the decoder 200 described above functions to detect and correct errors. Let $$n=31,\ k=21 \text{ and } P(X)=X^{10}+X^7+X^6+X+1 \quad (9)$$

Assume that the following 21-digit information sequence $$100110000001000100001 \quad (10)$$

is to be transmitted (right-most digit first) from the source 100 via the noisy channel 150 to the utilization circuit 220. The polynomial D(X) representative of these information digits is $$D(X)=X^{20}+X^{15}+X^{11}+X^4+X^3+1 \quad (11)$$

and the remainder R(X) is represented as follows:

$$R(X)=X^{10}D(X) \text{ MOD } P(X) =X^9+X^7+X^2+X+1 \quad (12)$$

Therefore, the transmitted sequence $V_T(X)$ is $$V_T(X)=X^{30}+X^{25}+X^{21}+X^{14}+X^{13} +X^{10}+X^9+X^7+X^2+X+1 \quad (13)$$

or $$1110000101100110000001000100001 \quad (14)$$

wherein the left-hand 10 digits comprise the check digit portion of the transmitted sequence.

Assume that the information digits in positions 2 and 17 of $V_T(X)$ are received by the decoder 200 of FIG. 1. In other words, $$N(X)=X^{29}+X^{14} \quad (15)$$

Therefore, the redundant sequence actually received by the decoder is $$V_R(X)=X^{30}+X^{29}+X^{25}+X^{21}+X^{13} +X^{10}+X^9+X^7+X^2+X+1 \quad (16)$$

or $$11100001011001\underline{0}00000001000100\underline{1}1 \quad (17)$$

wherein the incorrectly-received second and seventeenth information digits in (17) have been underlined for ease of identification. From the 21-digit information portion of the received sequence $V_R(X)$ the encoder obtains $$R_L(X)=X^7+X^5+X+1 \quad (18)$$

Thus, $$S(X)=R_L(X)\oplus R_R(X)=X^9+X^5+X^2 \quad (19)$$

and the pattern that is applied from the EXCLUSIVE-OR circuit 213 to the error syndrome register 215 is $$0010010001 \quad (20)$$

During the first decoding step described in detail above, the word (20) is applied to the combinatorial circuit 350. Inspection of the 10-digit representations listed in FIG. 2 reveals that no one of them is identical to (20). Therefore, no output signal is provided by the circuit 350 during the first step.

Next in the decoding process, the syndrome generator 225 is set to the representation listed in the first row of FIG. 3B. In turn, the EXCLUSIVE-OR circuits 260 . . . 370, 371 form the modulo 2 sum of this representation and that stored in the error syndrome register 215. This sum does not match any of the 10-digit patterns shown in FIG. 2. Therefore, the combinatorial circuit 350 does not activate one of its output leads in response to the application thereto of signals representative of this sum. This procedure continues in repetitive fashion as the syndrome generator 225 is shifted $n-k$ successive times. During this process no modulo 2 sum of the registrations stored in the register 215 and the generator 225 causes the circuit 350 to provide an output signal. Hence, no error occurrences are located during the second decoding step.

Subsequently, the third decoding step detailed above commences. After the syndrome generator 225 has been shifted 15 times, the respective patterns stored in the register 215 and the generator 225 are as follows:

$$00100100001 \quad (21)$$

and $$1010111010 \quad (22)$$

Modulo 2 addition of these two binary words gives $$1000101011 \quad (23)$$

which is seen to be identical to the 10-digit input pattern listed in the second row of FIG. 2. In response to the application to the input thereof of the word (23) the combinatorial circuit 350 activates its output lead 302 and the search for errors by the decoder 200 stops.

The activation of the output lead 302 of the circuit 350 is indicative of the second information digit of the received sequence being in error. Additionally, at this point in the decoding process the counter unit 240 registers a count of 15. This count is translated by the error address register 250 (in accordance with the aforementioned translation factor $n+1-a$) to the value 17. Hence, the second detected error is identified as being in the seventeenth digit position of the information portion of the received sequence.

In the particular case assumed above, the error address register 250 generates "1" correction signals in those time slots in which the second and seventeenth information digits are being applied from the buffer register 210 to the EXCLUSIVE-OR circuit 219 under control of the circuitry 205. In this way the information portion of the erroneously-received sequence 17 is converted to $$100110000001000100001 \quad (24)$$

which is identical to the originally-transmitted 21-digit information sequence represented in (10). Accordingly, despite the mutilation of the transmitted sequence during propagation along the channel 150, the 21-digit information sequence delivered to the utilization circuit 220 is a correct version of the information which originated at the source 100.

In one illustrative mode of operation characteristic of the decoder 200 described herein, the error address register 250 derives correction signals from a particular received sequence and is ready to apply these signals to the lead 222 as soon as the $k$th digit of the previous sequence has been delivered to the utilization circuit 220. These correction signals are supplied by the register 250 in synchronism with the outpulsing from the buffer register 210 of the information digits temporarily stored therein. Advantageously, digits are supplied by the register 210 one digit at a time in their original order at a uniform rate of $k/nR_L$ digits per second, where $R_L$ is the line rate in digits per second of the channel 150.

From the description herein it is apparent that each error syndrome word is generated and weighed during the time in which the corresponding encoded sequence is being received. Following the receipt of the sequence, at most $n-1$ additional operations are necessary to locate the error or errors which may be contained therein. (An operation comprises shifting the syndrome generator 225 once, incrementing the counter unit 240 and detecting any output from the combinatorial circuit 350.) One additional operational step, that of simultaneously inserting error location information into the error address register 250, clearing the syndrome generator 225 and resetting the counter unit 240, must be performed before the process of locating errors in the next sequence can commence. It is noted that the encoder 212 and the counter unit 217 may advantageously be controlled to operate on the received sequence which immediately follows the one whose syndrome is contained in the error syndrome register 215. Thus, if the abovementioned $n$ operations can be completed during the time in which the $n$ digits of the next sequence are being received, no queue of sequences requiring decoding can accumulate, as the error or errors in sequence N are located during the time in which sequence $N+1$ is being received. This requires only that the computation rate in operations per second be greater than or equal to the received bit rate in bits per second.

The number of operations per second that must be performed by the decoder 200 may be reduced in various different ways. For example, the combinatorial circuit 350 may be arranged to have $n$ output leads which respectively correspond to the occurrence of a single error in any one of the $n$ digit positions of a received sequence. In such a modified arrangement only $k—1$ shifts of the syndrome generator 225 are necessary to locate all single or double errors of the type specified herein.

The same reduction in operating cycles can be achieved by constructing the combinatorial circuit 350 in a manner such that a signal is produced on one of its output leads whenever the syndrome generator 225 contains an all-zero representation and the input to the circuit 350 is either identical to or differs in exactly one digit position from one of the FIG. 2 listings. In this way the search for single errors and that for double errors which include one check digit and one information digit are in effect carried out at the same time.

Thus, an information-processing system made in accordance with the principles of this invention is capable of automatically correcting all those single- and double-error patterns that include at least one erroneous information digits. For certain other types of errors the decoder is able to detect but not correct the occurrence thereof. This over-all error control capability is achieved in a remarkably simple and efficient manner.

Specific implementations of the source 100, the circuitry 205, the registers 210, 215 and 250, the encoder 212, the counter units 217 and 240, the gates 207, 209 and 211 and the EXCLUSIVE-OR circuits 213, 219, 260 . . . 370, 371 are considered in view of the particular end requirements therefor set forth above to be clearly within the skill of the art, and are accordingly not set forth in detail herein.

It is noted that this application is directed to a modification of the system described in my Patent No. 3,411,135, issued Nov. 12, 1968.

Furthermore, it is to be understood that the above-described decoding arrangements are only illustrative of the application of the principles of the present invention. In accordance with these principles, numerous other arrangements may be devised by those skilled in the art without departing from the spirit and scope of the invention.

What is claimed is:

1. In combination, means responsive to a redundant binary sequence for forming a pattern of binary signals representative of the error status of said sequence, means responsive to said pattern for counting the number of "1" signals therein, means responsive to said counting means indicating that said pattern contains more than "1" signals for initiating a decoding cycle of operation, a combinatorial circuit, means responsive to said initiating means for sequentally generating a predetermined set of binary representations, and means for successively adding each of said representations to said pattern and for applying said successive sums to said combinatorial circuit.

2. A combination as in claim 1 wherein said generating means includes a feedback-type shift register unit.

3. A combination as in claim 2 wherein said initiating means includes means for applying shift signals to said shift register unit.

4. A combination as in claim 3 further including means for counting the number of shift signals applied to said shift register unit.

5. A combination as in claim 4 wherein said sequence includes a total of $n$ digits the first $k$ of which are information digits, where $k$ and $n—k$ are the number of information and check digits, respectively, of a binary sequence which is a member of an error control code set, and wherein said combinatorial circuit includes $n—k$ input leads and $k$ output leads.

6. In combination in apparatus for decoding a received redundant sequence which is a member of an error correcting code, said sequence including an information digit portion, means for deriving from said received sequence a syndrome word which is representative of the error status of said sequence, combinatorial means including the same number of output leads as there are digits in said information digit portion, said combinatorial means being responsive to said syndrome word for providing a signal representation on said output leads to indicate whether or not said word is representative of a single error in the information digit portion of said sequence, means for selectively modifying said word to form additional syndrome words representative of all those double-error occurrences which include at least one erroneous information digit, and means for applying said additional syndrome words to said combinatorial means.

7. A combination as in claim 6 further including a source of shift signals, and wherein said modifying means includes a shift register responsive to said shift signals, and a unit for counting the number of shift signals applied to said shift register.

8. A combination as in claim 7 still further including means connected to said combinatorial means and to said counting unit for translating output indications therefrom into correction signals, and means responsive to said correction signals for modifying selected ones of the digits in the information portion of said received sequence.

9. In combination, means for storing an error syndrome digital pattern representative of the error status of a received redundant sequence which is a member of an error control code, means for supplying in sequence a predetermined set of digital patterns, combinatorial means, means for combining said error syndrome pattern with successive ones of said supplied patterns and for applying the resulting patterns in sequence to said combinatorial means.

10. A combination as in claim 9 further including means connected to said supplying means for registering an indication representative of which one of said predetermined set of patterns is being supplied by said supplying means.

References Cited

UNITED STATES PATENTS

| | | | |
|---|---|---|---|
| 3,114,130 | 12/1963 | Abramson | 340—146.1 |
| 3,162,837 | 12/1964 | Meggitt | 340—146.1 |
| 3,291,972 | 12/1966 | Helm | 340—146.1 X |

OTHER REFERENCES

Chu, Y.: Digital Computer Design Fundamentals, McGraw-Hill, 1962, pp. 312 and 318.

MALCOLM A. MORRISON, *Primary Examiner.*

C. E. ATKINSON, *Assistant Examiner.*

U.S. Cl. X.R.

235—153